(12) United States Patent
McDonough

(10) Patent No.: US 9,223,565 B2
(45) Date of Patent: Dec. 29, 2015

(54) RENDERING INTERFACE OBJECTS DEFINED BY A SEPARATE APPLICATION

(71) Applicant: GOOGLE INC., Mountain View, CA (US)

(72) Inventor: Colin Albright McDonough, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 80 days.

(21) Appl. No.: 14/055,464

(22) Filed: Oct. 16, 2013

(65) Prior Publication Data

US 2015/0106799 A1    Apr. 16, 2015

(51) Int. Cl.
    G06F 9/445    (2006.01)
(52) U.S. Cl.
    CPC ......................................... G06F 8/67 (2013.01)
(58) Field of Classification Search
    None
    See application file for complete search history.

(56) References Cited

U.S. PATENT DOCUMENTS

| 8,327,290 | B2 | 12/2012 | Barta et al. |
| 2004/0002944 | A1 | 1/2004 | Hauser et al. |
| 2004/0075623 | A1* | 4/2004 | Hartman .................... 345/1.3 |
| 2010/0125859 | A1 | 5/2010 | Bishop et al. |
| 2013/0086020 | A1 | 4/2013 | Addala et al. |

OTHER PUBLICATIONS

Lee, "International Search Report and Written Opinion issued in International Application PCT/US2014/060786", Oct. 15, 2014, 1-10.

* cited by examiner

*Primary Examiner* — Chuck Kendall
(74) *Attorney, Agent, or Firm* — Johnson, Marcou & Isaacs, LLC

(57) ABSTRACT

An application system provides a specification to render and update interface objects to a first application on one or more computing devices. The first application receives a request to provide instructions for presenting an object from a second application operating on the one or more computing devices. The first application communicates the instructions for presenting the object to the second application. The communication may be made via the operating system of the one or more computing devices or in another suitable manner. The first application receives an update to the instructions for presenting the object to the second application from an application provider or other application system. The first application communicates the updated instructions for presenting the object to the second application.

17 Claims, 5 Drawing Sheets

200

205 Service application system provides a service application to the user computing device

210 Service application makes instructions for interface object available

215 Service application provides interface object instructions to a third party application for rendering the interface object

220 Service application receives update to interface object instructions from service application system

225 Service application automatically transmits updated interface object instructions

230 Third party system displays updated interface object

Fig. 2

RENDERING INTERFACE OBJECTS DEFINED BY A SEPARATE APPLICATION

TECHNICAL FIELD

The present disclosure relates generally to updating a user interface of an application, and more particularly to using an application to render and update an interface object via a separate application.

BACKGROUND

Applications operating on user computing devices, such as mobile phones, tablet computers, or laptop computers, often display interface objects defined by third parties. In an example, a digital wallet application may display a button used to open a link to a card issuer account. In another example, a digital media player may display a button to open a digital wallet application module so that a purchase may be made. In another example, a gaming application may display a button to open an application from an advertiser.

The interface object, such as a link, button, advertisement, or other suitable object, may be provided to the host application by the provider of the content accessed with the button. For example, the provider of the digital wallet application module may provide the programming code for displaying a button on a host application. The provider of the digital wallet application module in the example may desire that the button have a certain appearance. The provider of the digital wallet application module may further desire to alter the appearance or function of the button in the future. The host application may desire that the button conform to a set of size and appearance restraints.

In conventional technology, buttons on host applications may be loaded from a server of the provider of the content accessed with the button via a network request. The rendering code is may be loaded via a network request. The affect of this process is similar to "hotlinking." Hotlinking is a term that refers to the practice of displaying an image or object on a website by linking to the same image or object on another website, rather than saving a copy of the image or object on the website on which the image will be shown. Mobile advertisements may use a web viewing application in third party applications which render the advertisements. The advertisements may be rendered in a manner resembling a button if desired.

In conventional technology, if the provider of the digital wallet application module in the example desires to change the appearance of the button, the system that provides the digital wallet application module must transmit new programming code to the integrator of the host application. The integrator of the host application must recompile and update the host application to incorporate the change.

SUMMARY

In certain example aspects described herein, a computer-implemented method to render and update interface objects is provided. An application system provides a specification to render and update interface objects to a first application on one or more computing devices. The first application receives a request to provide instructions for presenting an object from a second application operating on the one or more computing devices. The first application communicates the instructions for presenting the object to the second application. The communication may be via the operating system of the one or more computing devices or in another suitable manner. The first application receives an update to the instructions for presenting the object from an application provider or other application system. The first application communicates the updated instructions for presenting the object to the second application.

In other example aspects, a system and a computer program product to render and update interface objects are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 2 is a block flow diagram depicting a method to render and update an interface object on an application by a separate application, in accordance with certain example embodiments.

DETAILED DESCRIPTION OF EXAMPLE EMBODIMENTS

Overview

Figure 1:
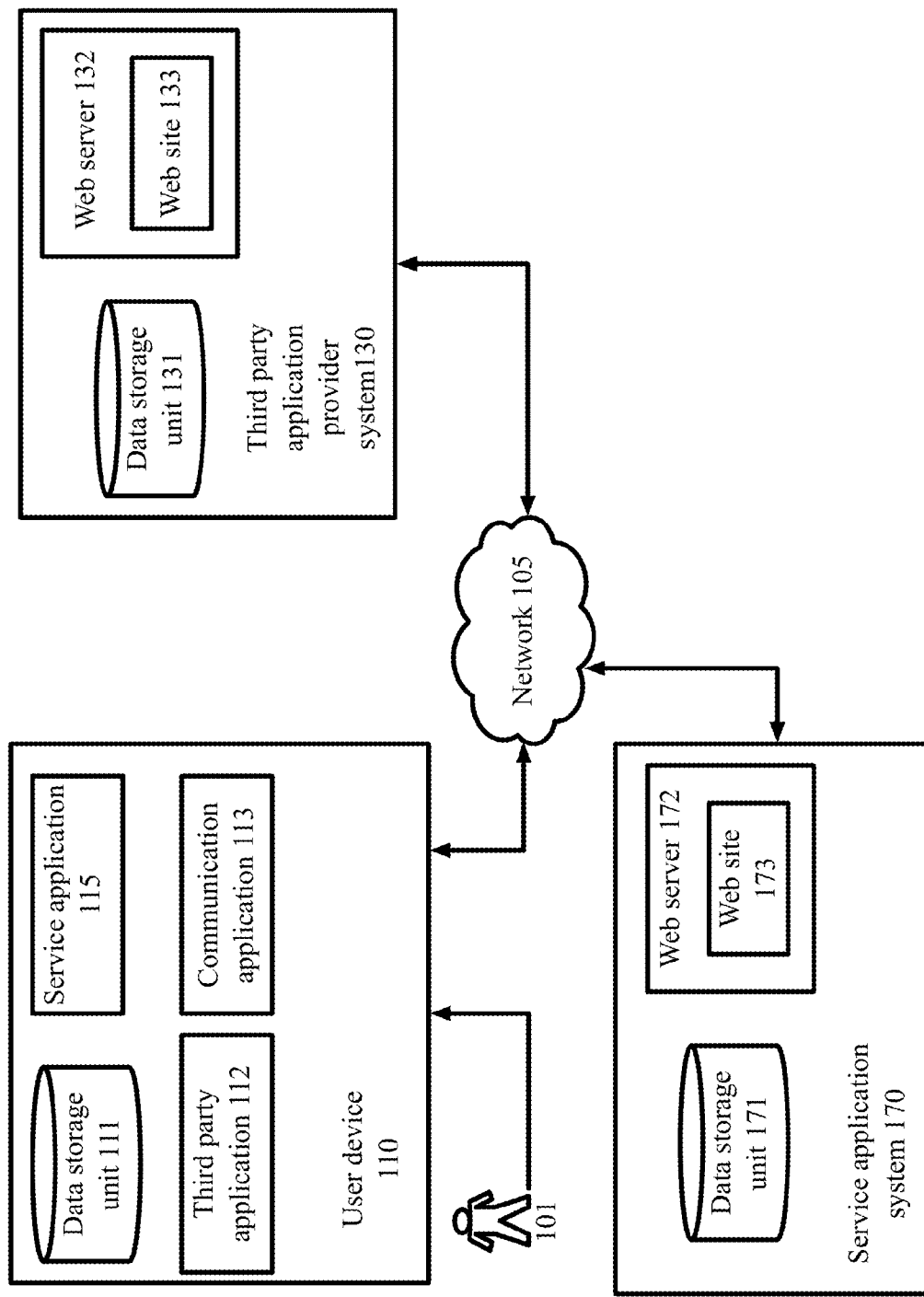
FIG. 1 is a block diagram depicting a system to render and update an interface object on an application by a separate application, in accordance with certain example embodiments.

The example embodiments described herein provide methods, systems, and computer program products for an application to render and update an interface object on another application. A service application system provides programming code to a service application on a user computing device. The service application provides an interface object specification to a third party application and prepares the interface object to meet the constraints of the third party application user interface. Using the interface object specification, the third party application can provide the interface object on a user interface. The interface object specification on the service application may be updated by the service application system. The updated interface object is automatically updated on the third party application without input or updating from the third party application provider.

More particularly, in certain example embodiments, a service application system provides a service application to the user computing device. The service application may be a stand alone application, a function of the user computing device operating system, a function of a separate application, or any suitable hardware, software, or firmware function. The service application may be downloaded by the user from a website of the service application system or from any suitable location. The service application may be installed on the user computing device by the manufacturer of the user computing device or by the provider of the operating system of the user computing device. The service application may be obtained from any suitable source and installed on the user computing device in any suitable manner. The service application may provide other suitable applications to enable various functions. For example, the service application may provide images, code, functions, and other suitable data to other applications.

The service application makes instructions, specifications, and other code for an interface object available for a third party application. The interface object may be a link, button, advertisement, other control, or other suitable object. For example, the interface object can be a virtual button on the user interface of the third party application that, when actuated, opens an application that is associated with the service application. In this example, the button may open a digital wallet application module. If a media provider application places the button on a user interface, a user may open the digital wallet application module from the media provider application to allow a purchase of the media. The service application in this example may be an application associated with the operating system of the user computing device or other associated party. The service application comprises instructions for one or more interface objects and other objects. The instructions for new objects or revisions to the objects may be received from the service application system or from any suitable source.

The service application provides interface object instructions to a third party application for rendering the interface object. The third party application may be any suitable application that requests to display the interface object on a user interface. The request may be provided to the service application by the third party application, by an operator configuring the user interface, or by any suitable party. The request includes information used by the service application to provide the instructions.

The request may be transmitted via the operating system of the user computing device. That is, the request may be transmitted without contacting the third party application provider or the service application system. The new instructions may be read by the service application from the third party application. In another embodiment, the third party application may transmit the request to the service application in any suitable manner.

In an example, the request may include the size constraints required for the interface object. The size constraints may provide the minimum and maximum sizes available for the object. The size constraints may only provide a size constraint in one dimension, such as the horizontal dimension. Alternatively, the size constraints may provide constraints for multiple dimensions, for example, the horizontal and vertical dimensions. The request may include constraints on the functions the interface object will be allowed to perform. For example, the object may be limited to a text and image display. The object may allow a link to be initiated, but not allow another application to be opened. The request may include a restraint on the appearance of the interface object. For example, a color restraint may limit the types of colors the object may present. Any suitable constraints or preferences may be included in the request.

The service application provides interface object instructions to the third party application. The service application receives the request and any constraints from the third party application. If constraints are not received form the third party application, then the service application may transmit a request for constraints, such as the type of user interface being used, the size of the space allocated to the interface option, or any other suitable constraints.

The service application determines the parameters for the interface object to meet the constraints of the third party application. For example, if the space allocated to the interface object is 200 pixels wide, the service application defines a set of interface object instructions that define a button of that size. A list of layers of the object may be provided, each layer being defined by an image width, height, and alignment parameters. The positions of the layers may be defined by either absolute positions (for example, 20 pixels smaller than the previous layer), or relative (for example, 20 percent smaller than the previous layer.) The interface object may be stretched or scaled in any manner to meet the constraints of the third party application.

The interface object instructions may be read by the third party application from the service application. That is, the instructions may be made available for the third party application to access and incorporate in the user interface of the third party application. The service application transmits the interface object instructions to the third party application in any suitable manner. For example, if the service application and the third party application are operating on the same operating system on the same user computing device, then the third party application may access the instructions directly from the service application. In another example, the service application may upload the instructions to an application, program, webpage, or any suitable format to transmit the instructions to the third party application.

The third party application receives the instructions, incorporates the instructions in the user interface code, and displays the interface object on the user interface. The interface object appears on the user interface of the third party application when the third party application is opened. The interface object displays in the requested location of the user interface. The interface object is available to perform the requested function if actuated by the user.

The service application receives an update from the service application system. The update may be to the appearance of the interface object. For example, a color, text, logo, size, or other attribute of the appearance may be changed. The functionality of the interface object may be updated. For example, the application that is accessed by actuating the object may be changed. Any suitable update may be received. The update may be received from the service application system by any suitable technology, such as an Internet connection over the network.

The service application automatically updates the interface object on the third party application. The service application may transmit a request to the third party application to receive a transfer of the updated instructions. The request may be transmitted via the operating system of the user computing device. That is, the request may be transmitted without contacting the third party application provider or the service application system. The new instructions may be read by the third party application from the service application. In another embodiment, the service application may transmit the updated interface object instructions to the third party application in any suitable manner.

The third party application displays the updated interface object on the user interface of the third party application. The display incorporates the new parameters dictated by the instructions from the service application. The third party application incorporates the updated instructions without input from a system administrator or other operator. The third party application incorporates the updated instructions without recompiling the third party application programming code. The updated instructions are loaded directly into the third party application from the service application.

In certain embodiments, the updated interface object instructions may be read by the third party application from the service application. That is, the updated instructions may be made available for the third party application to access and incorporate in the user interface of the third party application. The service application transmits the updated interface object instructions to the third party application in any suitable manner. For example, if the service application and the third party application are operating on the same operating system on the same user computing device, then the third party application may access the updated instructions directly from the service application. In another example, the service application may upload the updated instructions to an application, program, webpage, or any suitable format to transmit the instructions to the third party application.

Example System Architecture

Turning now to the drawings, in which like numerals indicate like (but not necessarily identical) elements throughout the figures, example embodiments are described in detail.

FIG. 1 is a block diagram depicting a system to render and update an interface object on an application by a separate application, in accordance with certain example embodiments. As depicted in FIG. 1, the example operating environment 100 includes a user network computing device 110, a service application computing system 170, and a third party application provider computing system 130 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 130, and 170) can exchange data. For example, the network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 130, and 170 includes a device having a communication module capable of transmitting and receiving data over the network 105. For example, each network device 110, 130, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 170 are operated by end-users or consumers, third party application provider system operators, and service application system operators, respectively.

The user 101 can use a communication application 113, such as a web browser application or a stand-alone application, to view, download, upload, or otherwise access documents or web pages via a distributed network 105. The network 105 includes a wired or wireless telecommunication system or device by which network devices (including devices 110, 130, and 170) can exchange data. For example, the network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment. The communication application 113 can interact with web servers or other computing devices connected to the network 105, including the user network device 110, the web server 172 of the service application system 170, and the web server 132 of the third party application provider system 130.

The user device 110 can include a third party application 112 that is configured to interact and communicate with the third party application provider system 170 via the communication application 113. For example, the third party application 112 can interact with the communication application 113, which in turn can be used and configured to communicate and share data with the third party application provider system 170 via the network 105. The third party application 112 can also be used and configured to communicate and share data with the third party application provider system 130. For example, the third party application 112 can interact with the communication application 113, which in turn can be used and configured to communicate and share data with the third party application provider system 130 via the network 105.

The third party application 112 can encompass any application, hardware, software, or process the user device 110 can employ to perform a function on the user computing device 110. The third party application 112 can interact with a communication application 113 as described herein or can be embodied as a companion application of the communication application 113. As a companion application, the third party application 112 executes within the communication application 113. That is, a third party application 111 can be an application program embedded in the communication application 113. The user device 110 can comprise appropriate technology that includes or is coupled to a web server (for example, a web browser application, or other suitable application for interacting with web page files). The user 101 can interact with a user interface provided by the third party application 112 to add, modify, or remove information with the third party application 112. In a web browser companion application embodiment, this user interface can be provided via the web browser.

The user device 110 can include a service application 115 that is configured to interact and communicate with one or more of the service application system 130 via the communication application 113, other applications on the user computing device 110, one or more user interface systems for the user computing device 110, or any other suitable applications, devices, or systems. For example, the service application 115 can interact with the communication application 113, which in turn can be used and configured to communicate and share data with the service application system 130 via the network 105. The service application 115 can also be used and configured to communicate and share data with the service application system 130. For example, the service application 115 can interact with the communication application 113, which in turn can be used and configured to communicate and share data with the service application system 130 via the network 105.

The service application 115 can encompass any application, hardware, software, or process the user device 110 can employ to perform a function on the user computing device 110. The service application 115 can interact with a communication application 113 as described herein or can be embodied as a companion application of the communication application 113. As a companion application, the service application 115 executes within the communication application 113. That is, a service application 115 can be an application program embedded in the communication application 113. The user device 110 can comprise appropriate technology that includes or is coupled to a web server (for example, a web browser application, or other suitable application for interacting with web page files).

The user 101 can interact with a user interface provided by the third party application 112 to add, modify, or remove information with the service application 115. The service application communicates with the third party application 112 or other applications in any suitable manner on the user computing device 110. For example, in a web browser companion application embodiment, this user interface can be provided via the web browser 114. Data from the service application 115 may be made available for the other applications, such as the applications, to access and incorporate in the applications. The service application transmits the data to the applications in any suitable manner. For example, if the service application and the applications are operating on the same operating system on the same user computing device, then the applications may access the data from the service application. In another example, the service application may upload the data to an application, program, webpage, or any suitable format to transmit the instructions to the applications.

The user device 110 also comprises a data storage unit 111 that is accessible by the third party application 112, the service application 115, and the web browser 114. The example data storage unit 111 can include one or more tangible computer-readable storage devices. The data storage unit 111 can be stored on the user device 110 or can be logically coupled to the user device 110. For example, the data storage unit 111 can include on-board flash memory and/or one or more removable memory cards or removable flash memory.

The service application system 170 comprises a web server 172, a web site 173, and a digital wallet account 174. The web server 172 can represent the computer-implemented system that the service application system 170 employs to host the website 173 of the service application system 170. The web server 172 and associated website 173 of the service application system 170 can represent the computer-implemented system that the service application system 170 uses to provide and maintain a service application 115 for a user 101, for example. In certain example embodiments, service application system 170 can execute and operate within the service application 115 of the user device 110, or it can execute and operate as a companion application to the service application 115 of the user device 110. Alternatively, the service application system 170 can execute and operate independently of the service application 115 of the user device 110. In such embodiments, the service application system 170 is configured, for example, to communicate with the user device 110 via the network 105. The service application system 170 also comprises an accessible data storage unit 171, which can include an on-board flash memory and/or one or more removable memory cards or removable flash memory.

The service application system 170 is configured to receive and store content and to communicate with the service application 115 via the network 105. For example, the service application system 170 can update interface objects and other data on the service application 115 and transmit the updates to the service application 115 on the user computing device 110.

The third party application provider system 130 comprises a third party application server 132, which can represent the computer-implemented system that the financial account issuer system 130 employs to host a web site 133 of the third party application provider system 130. The third party application web server 132 and associated website 133 of the third party application provider system 130 may represent the computer-implemented system that the third party application provider system 130 uses to create, provide, maintain a third party application 112. The third party application provider system 130 also comprises a data storage unit 131, which can used to store financial account information associated with a user financial account 134.

It will be appreciated that the network connections shown are example and other means of establishing a communications link between the computers and devices can be used. Moreover, those having ordinary skill in the art having the benefit of the present disclosure will appreciate that the user device 110, the service application system 170, and the third party application provider system 130 illustrated in FIG. 1 can have any of several other suitable computer system configurations. For example, a user device 110 can be embodied as a mobile phone or handheld computer may or may not include all the components described above.

Example Processes

Figure 3:
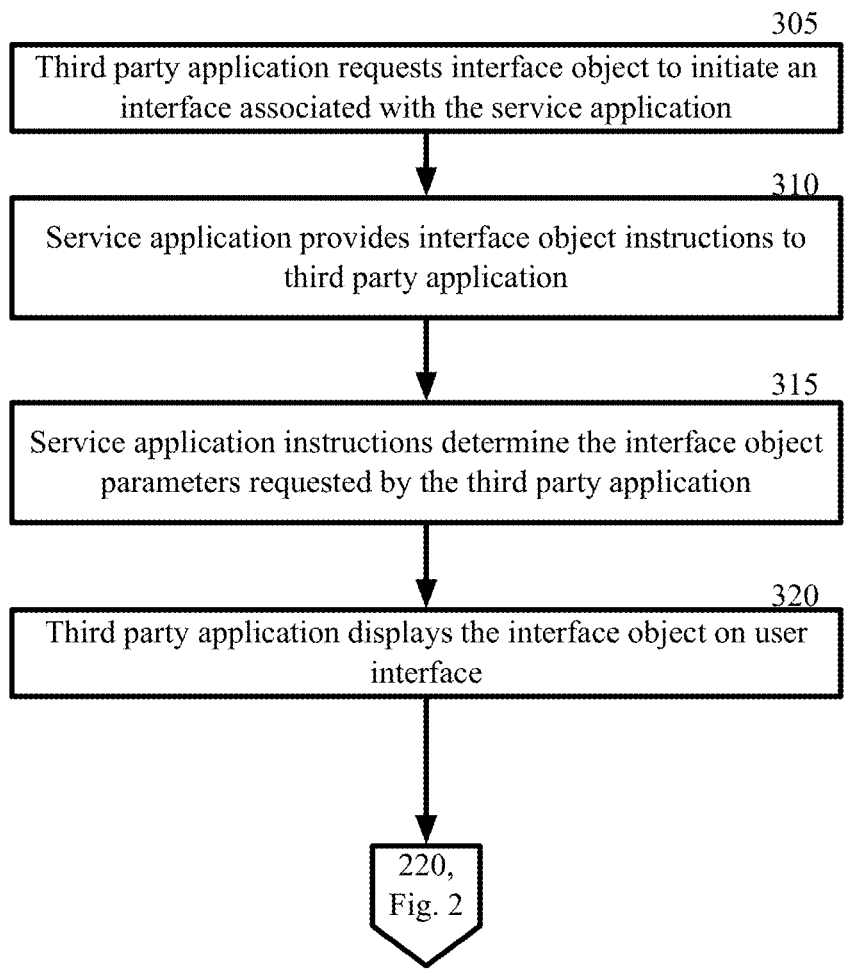
FIG. 3 is a block flow diagram depicting a method for an application to provide an interface object instructions to a third party application, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block diagram depicting a method to render and update an interface object on an application by a separate application, in accordance with certain example embodiments.

With reference to FIG. 2, in block 205, a service application system 170 provides a service application 115 to the user computing device 110. The service application 115 may be a stand alone application, a function of the user computing device 110 operating system, a function of a separate application, or any suitable hardware, software, or firmware function. The service application 115 may be downloaded by the user 101 from a website of the service application system 170 or from any suitable location. The service application 115 may be installed on the user computing device 110 by the manufacturer of the user computing device 110 or by the provider of the operating system of the user computing device 110. The service application 115 may be obtained from any suitable source and installed on the user computing device 110 in any suitable manner. The service application 115 may provide other suitable applications to enable various functions. For example, the service application 115 may provide images, code, functions, and other suitable data to other applications.

In block 210, the service application 115 makes instructions, specifications, and other code for an interface object available for a third party application 112. The interface object may be a link, button, advertisement, or other suitable object. For example, the interface object is a virtual button on the user interface of the third party application 112 that, when actuated, opens an application that is associated with the service application 115. In this example, the button may open a digital wallet application module. If a media provider application places the button on a user interface, a user 101 may open the digital wallet application module from the media provider application to allow a purchase of the media. The service application 115 in this example may be an application associated with the operating system of the user computing device 110 or other associated party. The service application 115 comprises instructions for one or more interface objects and other objects. The instructions for new objects or revisions to the objects may be received from the service application system 170 or from any suitable source.

In block 215, the service application 115 provides interface object instructions to a third party application 112 for rendering the interface object. Block 215 will be described in greater detail in method 215 of FIG. 3.

FIG. 3 is a block flow diagram depicting a method 215 for an application to provide an interface object instructions to a third party application, in accordance with certain example embodiments.

In block 305, the third party application 112 requests an interface object to initiate an interface associated with the service application 115. The third party application 112 may be any suitable application that requests to display the interface object on a user interface. The request may be provided to the service application 115 by the third party application 112, by an operator configuring the user interface, or any suitable party. The request includes any information needed by the service application 115 for providing the instructions.

The request may be transmitted via the operating system of the user computing device 110. That is, the request may be transmitted without contacting the third party application provider system 130 or the service application system 170. The new instructions may be read by the service application 115 from the third party application 112. In another embodiment, the third party application 112 may transmit the request to the service application 115 in any suitable manner.

In an example, the request may include the size constraints required for the interface object. The size constraints may provide the minimum and maximum sizes of available for the object size. The size constraints may only provide a size constraint in one dimension, such as the horizontal dimension. The request may include constraints on the functions the interface object will be allowed to perform. For example, the object may be limited to a text and image display. The object may allow a link to be initiated, but not allow another application to be opened. The request may include a restraint on the appearance of the interface object. For example, a color restraint may limit the types of colors the object may present. Any suitable constraints or preferences may be included in the request.

In block 310, the service application 115 provides interface object instructions to the third party application 112. The service application 115 receives the request and any constraints from the third party application 112. If no constraints are received form the third party application 112, then the service application 115 may transmit a request for constraints, such as the type of user interface being used, the size of the space allocated to the interface option, or any other suitable constraints.

In block 315, the service application 115 determines the parameters for the interface object to meet the constraints of the third party application 112. For example, if the space allocated to the interface object is 200 pixels wide, the service application 115 defines a set of interface object instructions that define a button of that size. A list of layers of the object may be provided, each layer being defined by an image width, height, and alignment parameters. The positions of the layers may be defined by either absolute positions (for example, 20 pixels smaller than the previous layer), or relative (for example, 20 percent smaller than the previous layer.) The interface object may be stretched or scaled in any manner to meet the constraints of the third party application 112.

The interface object instructions may be read by the third party application 112 from the service application 115. That is, the instructions may be made available for the third party application 112 to access and incorporate in the user interface of the third party application 112. The service application 115 transmits the interface object instructions to the third party application 112 in any suitable manner. For example, if the service application 115 and the third party application 112 are operating on the same operating system on the same user computing device 110, then the third party application 112 may access the instructions directly from the service application 115. In another example, the service application 115 may upload the instructions to an application, program, webpage, or any suitable format to transmit the instructions to the third party application 112.

In block 320, the third party application 112 receives the instructions, incorporates the instructions in the user interface code, and displays the interface object on the user interface. The interface object appears on the user interface of the third party application 112 when the third party application 112 is opened or at any suitable time. The interface object displays in the requested location of the user interface. The interface object is available to perform the requested function if actuated by the user 101.

Figure 4:
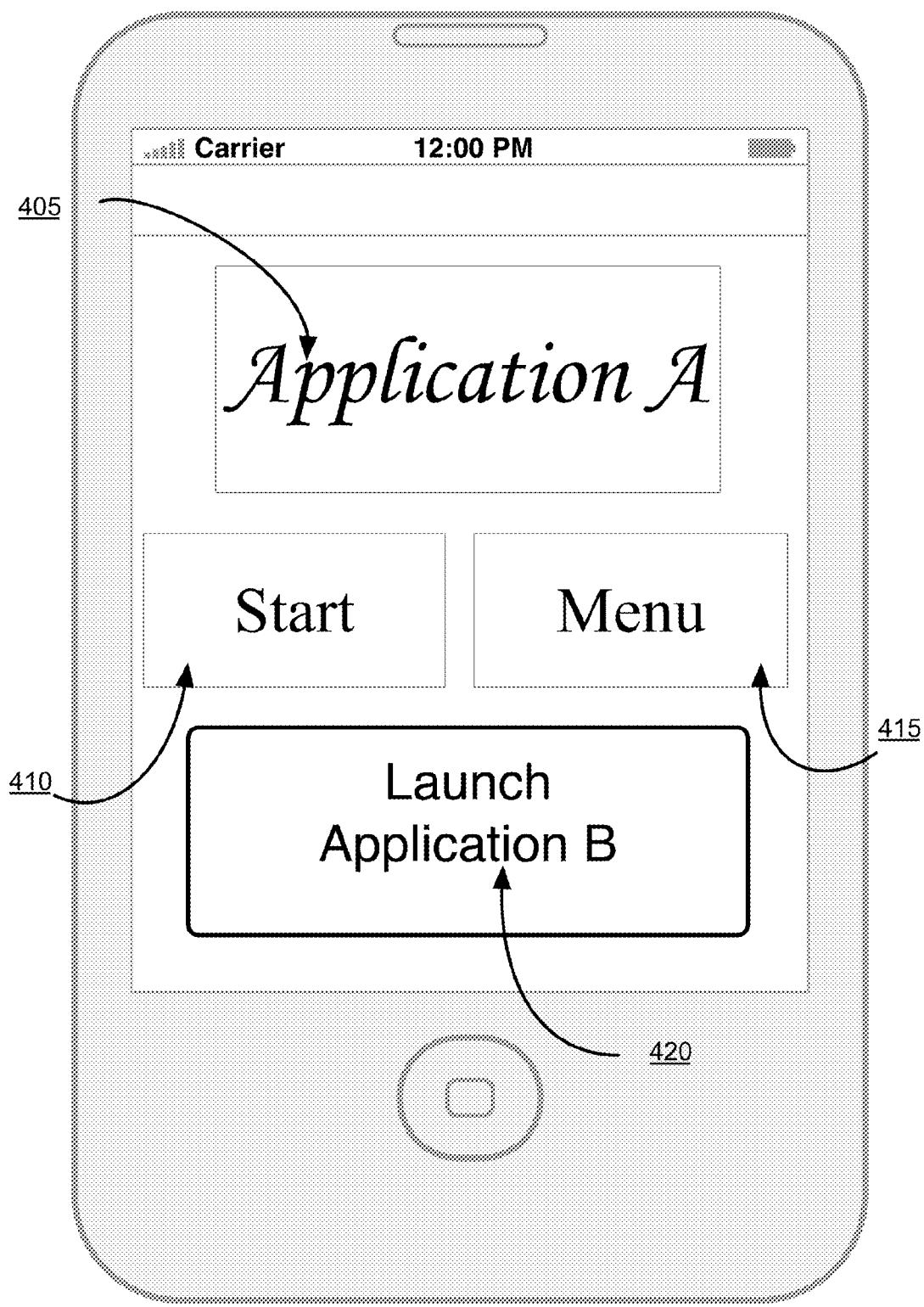
FIG. 4 is an illustration of an example user interface of an application displaying an interface object, in accordance with certain example embodiments.

FIG. 4 is an illustration of an example user interface of an application displaying an interface object, in accordance with certain example embodiments. In the example, the third party application 112 is represented by Application A 405. The application 405 comprises a start button 410 and a menu button 415.

The application 405 user interface displays an interface object as illustrated as Launch Application B 420. In this example, actuating the button would cause Application B to open. Application B might open in another window, another tab on a user interface, within Application A, or in any suitable manner.

Returning to FIG. 2, in block 220, the service application 115 receives an update from the service application system 170. The update may be to the appearance of the interface object. For example, a color, text, logo, or other attribute of the appearance may be changed. The functionality of the interface object may be updated. For example, the application that is accessed by actuating the object may be changed. Any suitable update may be received. The update may be received from the service application system 170 by any suitable technology, such as an Internet connection over the network.

In block 225, the service application 115 automatically updates the interface object on the third party application 112. The service application may transmit a request to the third party application 112 to receive a transfer of the updated instructions. The request may be transmitted via the operating system of the user computing device 110. That is, the request may be transmitted without contacting the third party application provider system 130 or the service application system 170. The new instructions may be read by the third party application 112 from the service application 115. In another embodiment, the service application 115 may transmit the updated interface object instructions to the third party application 112 in any suitable manner.

In block 230, the third party application 112 displays the updated interface object on the user interface of the third party application 112. The display incorporates the new parameters dictated by the instructions from the service application 115. The third party application 112 incorporates the updated instructions without input from a system administrator or other operator. The third party application 112 incorporates the updated instructions without recompiling the third party application 112 programming code. The updated instructions are loaded directly into the third party application 112 from the service application.

The updated interface object instructions may be read by the third party application 112 from the service application 115. That is, the updated instructions may be made available for the third party application 112 to access and incorporate in the user interface of the third party application 112. The service application 115 transmits the updated interface object instructions to the third party application 112 in any suitable manner. For example, if the service application 115 and the third party application 112 are operating on the same operating system on the same user computing device 110, then the third party application 112 may access the updated instructions directly from the service application 115. In another example, the service application 115 may upload the updated instructions to an application, program, webpage, or any suitable format to transmit the instructions to the third party application 112.

Other Example Embodiments

Figure 5:
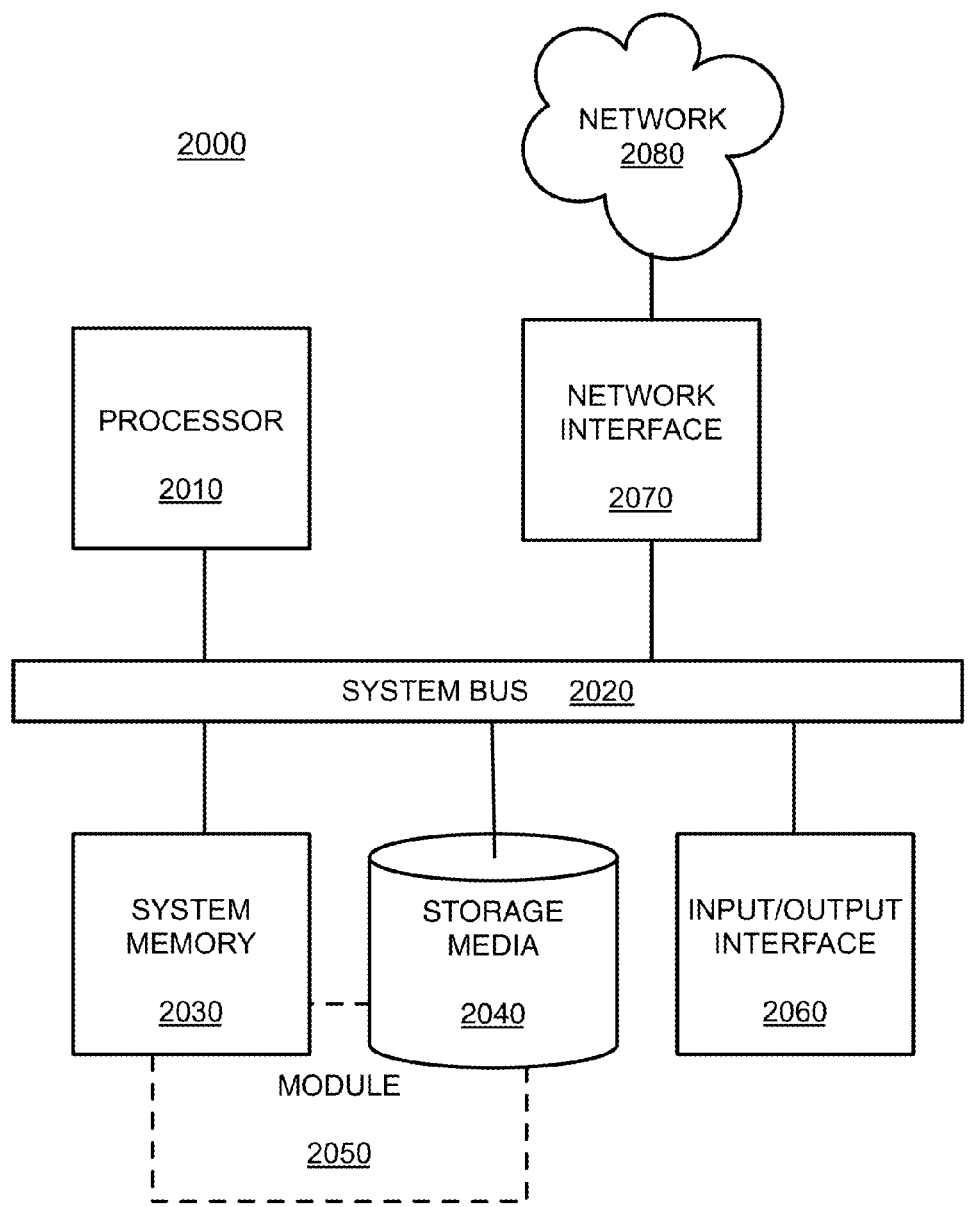
FIG. 5 is a block diagram depicting a computer machine and module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a Smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render and update interface objects, comprising:
   receiving, by a first application operating on a user computing device from a second application operating on the user computing device, a request to provide instructions to present an interface object, wherein the instructions comprise a first functionality for the interface object;
   communicating, by the first application operating on the user computing device, the instructions to present the interface object comprising the first functionality to the second application;
   presenting, by the second application operating on the user computing device, the interface object comprising the first functionality via a user interface of the user computing device according to the instructions;
   receiving, by the first application operating on the user computing device, an update to the instructions to present the interface object, wherein the update comprises a second functionality; and
   communicating, by the first application operating on the user computing device and to the second application operating on the user computing device, the updated instructions for presenting the interface object comprising the second functionality;
   presenting, by the second application operating on the user computing device, the updated interface object comprising the second functionality via the user interface of user computing device according to the updated instructions.

2. The method of claim 1, wherein the second application renders the updated interface object without updating programming code of the second application.

3. The method of claim 1, wherein the second application renders the updated interface object without input from an operator.

4. The method of claim 1, further comprising:
   receiving, by the first application operating on the user computing device, a set of constraints available on the second application for displaying the interface object; and
   configuring, by the first application operating on the user computing device, the instructions and the updated instructions for presenting the interface object to meet the set of constraints.

5. The method of claim 4, wherein configuring the instructions comprises scaling a size of the interface object described by the instructions to fit a size constraint included in the set of constraints.

6. The method of claim 1, wherein the first application communicates the instructions and the updated instructions via the operating system of the user computing device.

7. A system to render and update interface objects, comprising:
   a storage device;
   a processor communicatively coupled to the storage device, wherein the processor executes application code instructions that are stored in the storage device to cause the system to:
   receive, by a first application, a request to provide instructions for presenting an interface object, wherein the instructions comprise a first functionality for the interface object;
   communicate, by the first application, the instructions for presenting the interface object to the second application for the second application to present the interface object comprising the first functionality via a user interface according to the instructions;
   receive, by the first application, an update to the instructions for presenting the interface object, wherein the updated instructions comprise a second functionality for the interface object; and
   communicate, by the first application, the updated instructions for presenting the interface object to the second application for the second application to present the updated interface object comprising the second functionality via the user interface according to the updated instructions.

8. The system of claim 7, wherein the second application renders the updated interface object without updating programming code of the second application.

9. The system of claim 7, wherein the second application renders the updated interface object without input from an operator.

10. The system of claim 7, wherein the first application and the second application are executed by the processor.

11. The system of claim 7, wherein the processor is further configured to execute application code instructions to cause the system to:
   receive, by the first application, a set of constraints available on the second application for displaying the interface object; and
   configure, by the first application, the instructions and the updated instructions for presenting the interface object to meet the set of constraints.

12. The system of claim 11, wherein configuring the instructions comprises scaling a size of the interface object described by the instructions to fit a size constraint included in the set of constraints.

13. The system of claim 7, wherein the processor communicates, by the first application, the instructions and the updated instructions via an operating system of the one or more computing devices.

14. A computer program product, comprising:
   a non-transitory computer-readable storage device having computer-readable program instructions embodied thereon that when executed by a computer cause the computer to render and update interface objects, the computer-executable program instructions comprising:
   computer-executable program instructions to receive a request to provide a instructions for presenting an interface object, the request being received from a second application operating on the computer, wherein the instructions comprise a first functionality for the interface object;
   computer-executable program instructions to communicate the instructions for presenting the interface object to the second application for the second application to present the interface object comprising the first functionality via a user interface of the computer according to the instructions;
   computer-executable program instructions to receive an update to the instructions for presenting the interface object, wherein the updated instructions comprise a second functionality for the interface object; and
   computer-executable program instructions to communicate the updated instructions for presenting the interface object to the second application for the second application to present the updated interface object comprising the second functionality via the user interface of the computer according to the updated instructions.

15. The computer program product of claim 14, further comprising:
- computer-executable program instructions to receive a set of constraints available on the second application for displaying the interface object; and
- computer-executable program instructions to configure the instructions and the updated instructions for presenting the interface object to meet the set of constraints.

16. The computer program product of claim 15, wherein configuring the instructions comprise scaling a size of the interface object described by the instructions to fit a size constraint included in the set of constraints.

17. The computer program product of claim 14, wherein the instructions and the updated instructions are communicated via the operating system of the computer.

* * * * *